United States Patent [19]

Ploumen

[11] 4,390,896
[45] Jun. 28, 1983

[54] POWER SUPPLY CIRCUIT

[75] Inventor: Hubert J. Ploumen, Borne, Netherlands

[73] Assignee: Hollandse Signaalapparaten B.V., Hengelo, Netherlands

[21] Appl. No.: 243,963

[22] PCT Filed: Jun. 10, 1980

[86] PCT No.: PCT/NL80/00021
§ 371 Date: Feb. 26, 1981
§ 102(e) Date: Feb. 26, 1981

[87] PCT Pub. No.: WO81/00182
PCT Pub. Date: Jan. 22, 1981

[30] Foreign Application Priority Data
Jun. 27, 1979 [NL] Netherlands .................. 79/04989

[51] Int. Cl.³ ........................................ H04N 9/27
[52] U.S. Cl. ................................................ 358/73
[58] Field of Search ............ 358/73, 190; 315/1; 313/473; 340/701, 703, 704

[56] References Cited

U.S. PATENT DOCUMENTS

| | | | |
|---|---|---|---|
| 3,465,232 | 9/1969 | Weber | 336/69 |
| 3,720,781 | 3/1973 | West | 358/73 |
| 3,863,097 | 1/1975 | Labudda | 315/14 |

Primary Examiner—John C. Martin
Attorney, Agent, or Firm—Robert J. Kraus

[57] ABSTRACT

A power supply circuit for applying a rapidly varying high voltage to a penetration type color cathode ray tube. First and second transforming units are provided for converting video signals and a supply voltage to high voltage levels of the cathode ray tube circuitry. Capacitive coupling of disturbance signals through the transforming units is prevented by the utilization of shielding to reduce capacitance between transformer windings and by modulating the video signals to higher frequencies, enabling the use of a low impedance transformer. Short rise times of video signals are maintained during conversion by use of a differentiating circuit incorporating a transformer to couple video timing information to the high voltage cathode ray tube circuitry.

2 Claims, 1 Drawing Figure

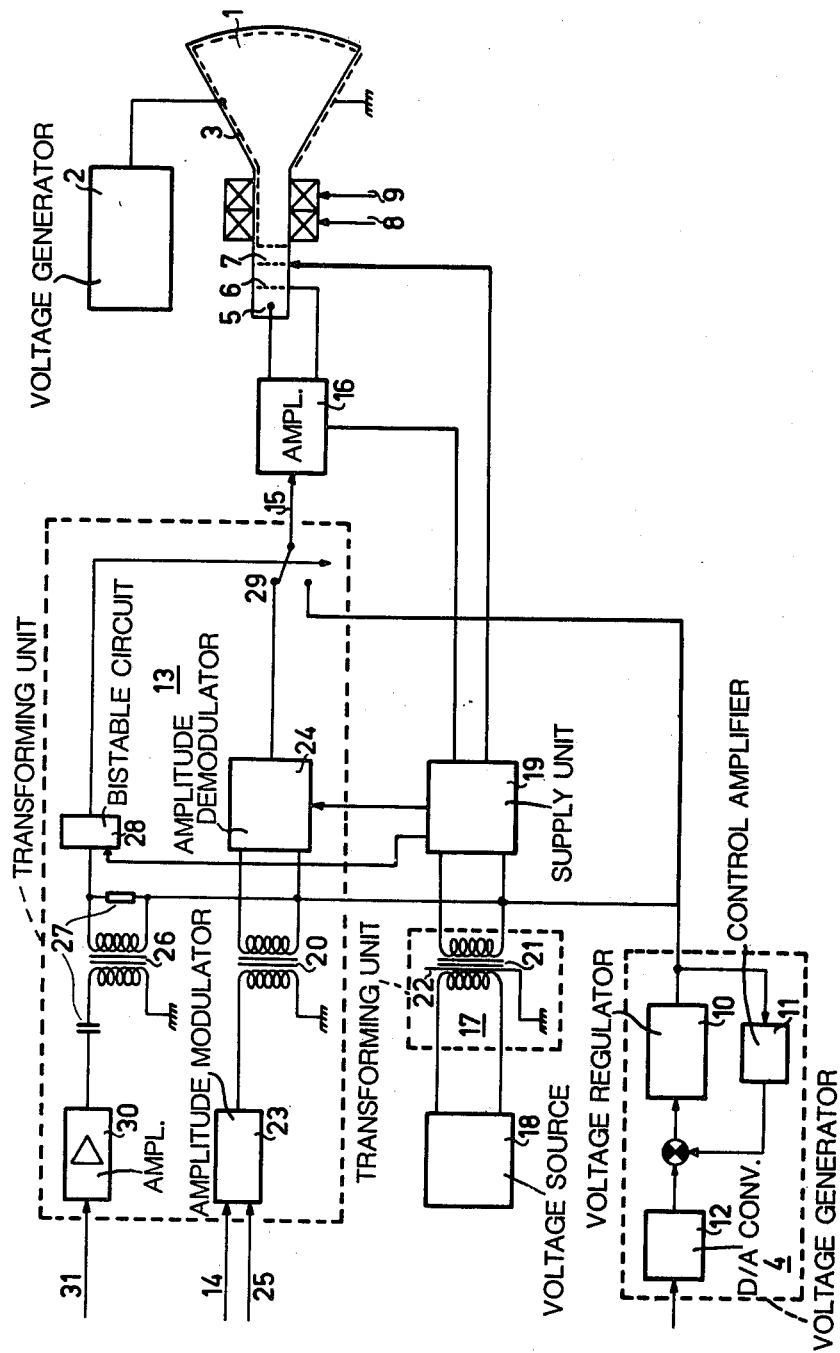

POWER SUPPLY CIRCUIT

BACKGROUND OF THE INVENTION

The invention relates to a power supply circuit for applying a rapidly varying high voltage to a penetron-type cathode ray tube for a colour display system comprising a first voltage generator for supplying a constant high voltage to the tube's anode, a second voltage generator for supplying the cathode with a voltage varying in magnitude with the different colours, a first transforming unit for converting video signals referenced to a first reference voltage into video signals referenced to the voltage varying in magnitude with the different colours and functioning as second reference voltage, a second transforming unit for converting a supply voltage referenced to the first reference voltage into a supply voltage referenced to the second reference voltage, and a supply unit for deriving from the supply voltage referenced to the second reference voltage the supply voltages needed to process the video signals referenced to the second reference voltage and to display these video signals on the cathode ray tube.

To enhance the clarity of a display, a multicolour tube is employed. In order to obtain good positioning accuracy while considering the relatively short working distance of such a display system, it is desirable to eliminate the need for a shadow-mask. A penetron tube accomplishes this by using two different phosphor layers. With a certain voltage applied to the tube, the electrons primarily excite the first phosphor layer, while with a certain higher voltage applied to the tube the electrons are sufficiently accelerated to penetrate the barrier layer between the two phosphor layers and excite the second phosphor layer. The two voltages applied to the tube light up the screen in respective colours; and intermediate voltages produce other colours. In practice, four-colour displays are in common use, such as those described in U.S. Pat. Nos. 3,780,339 and 4,099,088.

In the four-colour display described in U.S. Pat. No. 3,780,339 the anode of the tube is supplied with a voltage switchable to two values and the cathode with a d.c. voltage which is modulated with a voltage switchable to two values. In this way, using two switches, the four voltage levels can be obtained to display the particular colours.

In the four-colour display described in U.S. Pat. No. 4,099,088, a "split anode" penetron tube is employed, where one anode is supplied with a constant voltage and the other with a voltage switchable to four values.

Many of the colour display systems, using penetron-type cathode ray tubes, experience the remarkable phenomenon that, with sufficiently rapid switching of the voltages sound waves are propagated from the front of the cathode ray tube. These sound waves are of such an intensity that they cause noise pollution in the vicinity of the display. For the purposes of this application, noise pollution is considered to exist at about 50 dBA.

To prevent noise pollution, the power supply circuit comprises a first voltage generator for supplying a constant high voltage to the anode and a second voltage generator for producing a voltage varying in magnitude with the different colours, which is applied to the cathode after being modulated with the video signals to be displayed to cooperate with the anode voltage to effect the display of the video signals in the particular colours.

The reason that the choice of the voltage to be applied to a certain electrode is determinative of the presence or absence of noise pollution is explained as follows. The front of the penetron tube is protected by an implosion screen cemented onto the picture screen with a silicon rubber. At the vacuum side of the picture screen the phosphor layer is provided with a conductive coating, which serves as an electrode (anode). The penetron tube is mounted in a metal frame. This frame and a portion of the implosion screen which is also provided with a conductive coating are connected to earth. The combination of picture screen and implosion screen may be regarded as a capacitor of which the plates are connected together not by a rigid medium, but by a resilient medium (rubber). On supplying the anode with a high voltage alternating at a certain frequency, the alternating force acting on the implosion screen will cause this screen, as one rigid mass, to move harmonically. The noise produced is attributed to this isophase motion of the implosion screen. The noise can be considerably reduced by keeping the anode voltage constant.

Constant anode voltage power supply circuits are known from U.S. Pat. Nos. 3,720,781 and 3,863,097, however these circuits do not solve the problem that the transforming units in the power supply circuit, as described in the opening paragraph, capacitively couple video signal disturbances which distort the picture on the screen.

SUMMARY OF THE INVENTION

It is an object of the present invention to minimize these distortions. According to the invention the first transforming unit comprises a first inductive coupling, an amplitude modulator, and an amplitude demodulator. The video signals are modulated on a carrier frequency and the modulated signal so obtained is demodulated after conversion. The second transforming unit comprises an inductive coupling in which the capacitance between the primary and the secondary windings is substantially eliminated by inserting a shield, having the potential of the first reference voltage, between the windings.

BRIEF DESCRIPTION OF THE DRAWING

The invention will now be described with reference to the accompanying FIGURE which shows a block diagram of the power supply circuit.

DESCRIPTION OF THE PREFERRED EMBODIMENT

In the FIGURE a penetron-type cathode ray tube 1 for a colour display system is electrically-connected to a first voltage generator 2 which supplies an anode 3 of the cathode ray tube with a constant high voltage. A second voltage generator 4 produces a voltage varying in magnitude with the different colours, which voltage after being modulated with the video signals to be displayed is applied to cathode 5 of the cathode ray tube. The voltages to be applied to grids 6 and 7 must be referenced to the voltage supplied by the second voltage generator 4. The FIGURE further shows terminals 8 and 9 for the focussing and deflection voltages.

The second voltage generator 4 comprises a voltage regulator 10 with a negative feedback from its output to its input via control amplifier 11. The input voltage of regulator 10 is supplied by a digital-analogue converter 12. This converter receives a computer-supplied digital code representing the colour to be displayed.

The voltage supplied by the second voltage generator 4 is a floating reference voltage modulated by the video signals. The power supply circuit comprises a first transforming unit 13 to which the video signals are supplied via line 14. The video signals are referenced to a first reference voltage, preferably "earth". In the unit 13 the video signals are referenced to the voltage supplied by the second voltage generator 4 (second reference voltage), which varies in magnitude with the different colours. The video signals referenced to the second reference voltage vary in magnitude with the different colours, and are applied to cathode 5 of the cathode ray tube via line 15 and amplifier 16. Like grid 7 of the cathode ray tube, amplifier 16 must have a supply voltage applied which is referenced to the second reference voltage. The voltage is provided by means of a second transforming unit 17 wherein a supply voltage, produced by voltage source 18 and referenced to the first reference voltage, is converted into a supply voltage referenced to the second reference voltage. The latter voltage is applied to supply unit 19, which produces supply voltages referenced to the second reference voltage and required for amplifier 16, grids 6 and 7 and for the supply of various circuits of the first transforming unit.

The conversion in the first and second transforming units is effected by inductive couplings (transformers) 20 and 21, respectively. If not prevented, the capacitance between the primary and the secondary windings of the inductive coupling 21 through the lines carrying the second reference voltage, together with the capacitance between the primary and the secondary windings of inductive coupling 20, disturbs the video signals, causing a distorted picture on the screen. These disturbing effects are eliminated by two measures. First, a shield 22 having the potential of the first reference voltage is inserted between the primary and secondary windings of inductive coupling 22, so that the capacitance between these windings is reduced substantially to zero. Second, the first transforming unit 13 is provided with an amplitude modulator 23 and an amplitude demodulator 24. The video signals are first modulated at a carrier frequency applied via line 25 and, after conversion by the inductive coupling, are again demodulated. When the signals are converted in a higher frequency range, a smaller transformer can be employed, permitting the conversion to be realised with a lower impedance, which considerably reduces the disturbing effect of the capacitance between the primary and the secondary windings of coupling 20.

When a video signal is applied, a voltage increase is impressed on line 14. The rise time of this voltage increase should be relatively long to keep the video signal to be converted in the first transforming unit in a narrow frequency band, but for the display on the screen the rise time should be very short. However, it is practically impossible to convert the video signal with both sufficient accuracy and a very short rise time without making the bandwidth of the signal to be converted too large. For this reason the first transforming unit 13 comprises a second inductive coupling 26, a differentiating network 27 incorporating this coupling, a bistable circuit 28 connected to network 27, a switch 29, and an amplifier 30. Line 31 carries a square wave signal to the first transforming unit 13. This signal has very steep edges (short duration) which determines the starting and ending times of the display in a certain colour. The rising edge appears as soon as the relatively long rise time of the video signal has elapsed, while the falling edge appears before the video signal changes. Since only the starting and ending times of the square wave signals are of importance, the signal is differentiated in the RC network 27 after passing through amplifier 30. Network 27 also comprises the inductive coupling to change the reference voltage for the differentiated signal. The inductive coupling 26 converts the differentiated square wave signal referenced to the first reference voltage into a signal referenced to the second reference voltage. In bistable circuit 28 the differentiated square wave is again converted to a pure square wave signal referenced to the second reference voltage. This square wave signal controls switch 29.

During the rising edge of the square wave signal, i.e. the instant of commencing the display of video signals in a certain colour, switch 29 is set to the position shown in the FIGURE. At this instant the amplifier 16 is fed with the video signals referenced to the second reference voltage. During the falling edge of the square wave, i.e. at the instant of finishing the display of video signals in a certain colour, switch 29 is set to the other position, to supply the amplifier 16 with the second reference voltage.

Preferably a difference amplifier is used to implement amplifier 16, for the following reason. The acceleration of the electrons in the cathode ray tube is determined by the anode-cathode voltage, and not by the deflection voltage. Variations in the cathode voltage through the video signals displayed in the different colours result in positional errors in the display on the screen. These positional errors may be minimized by allowing the voltage across grid 6 to change with the aforementioned variations in the cathode voltage. Further corrections of the positional errors are made in the deflection voltage.

It should finally be noted that although inductive couplings are employed in the first and the second transforming units, other types of electrically isolated couplings could have been used. For example, couplings 20 and 26, could be implemented by the use of optoelectronic couplers.

I claim:

1. A power supply circuit for applying a rapidly varying high voltage to a penetron-type cathode ray tube for a color display system, comprising a first voltage generator for supplying a constant high voltage to the anode, a second voltage generator for supplying to the cathode a voltage having a varying magnitude representative of different colors, a first transforming unit for converting video signals referenced to a first reference voltage into video signals reference to the voltage having a varying magnitude which serves as a second reference voltage, a second transforming unit for converting a supply voltage referenced to the first reference voltage into a supply voltage reference to the second reference voltage, and a supply unit for deriving from the supply voltage referenced to the second reference voltage supply voltages for the first transforming unit and the cathode ray tube;

characterized in that the first transforming unit comprises an amplitude modulator, a first inductive coupling, and an amplitude demodulator for respectively modulating at a carrier frequency the video signals referenced to the first reference voltage, converting the modulated video signals into signals referenced to the second reference voltage, and demodulating the converted video signals, said inductive coupling comprising primary and secondary windings and a shield between said windings having the potential of the first reference voltage.

2. A power supply circuit as in claim 1, characterized in that the first transforming unit comprises a differentiating network including a second inductive coupling, and a bistable circuit connected to said network, said network and bistable circuit being operable to convert a square wave signal determinative of the start and the end of displays in a certain color, and referenced to the first reference voltage, into a square-wave signal referenced to the second reference voltage, said first transforming unit further comprising a switch for coupling to the cathode either the second reference voltage or the video signals referenced to the second reference voltage in response to the voltage level of the square wave referenced to the second reference voltage.

* * * * *